(12) United States Patent
Maslov

(10) Patent No.: US 6,466,240 B1
(45) Date of Patent: Oct. 15, 2002

(54) METHOD FOR VISUALLY WRITING PROGRAMS OR SCRIPTS THAT TRANSFORM STRUCTURED TEXT PRESENTED AS A TREE

(76) Inventor: Vadim Maslov, 2902 Rock Manor Ct., Herndon, VA (US) 20171

( * ) Notice: Subject to any disclaimer, the term of this patent is extended or adjusted under 35 U.S.C. 154(b) by 0 days.

(21) Appl. No.: 09/285,053

(22) Filed: Apr. 2, 1999

Related U.S. Application Data

(60) Provisional application No. 60/092,492, filed on Jul. 8, 1998.

(51) Int. Cl.[7] .............................. G06F 3/14; G06F 17/21
(52) U.S. Cl. ...................... 345/853; 345/967; 345/804; 345/704; 707/513; 717/113; 717/144
(58) Field of Search ................................ 345/853, 855, 345/704, 763, 966, 967, 762, 804, 854; 707/513, 514, 515, 907, 530, 531; 717/100, 110, 113, 120, 136, 139, 141, 144

(56) References Cited

U.S. PATENT DOCUMENTS

| | | | | |
|---|---|---|---|---|
| 5,555,362 A | * | 9/1996 | Yamashita et al. ........ | 707/514 X |
| 5,557,722 A | * | 9/1996 | DeRose et al. ............. | 707/513 |
| 5,801,702 A | * | 9/1998 | Dolan et al. ................ | 345/854 |
| 6,078,327 A | * | 6/2000 | Liman et al. ................ | 345/854 |
| 6,098,072 A | * | 8/2000 | Sluiman et al. ......... | 707/514 X |
| 6,247,020 B1 | * | 6/2001 | Minard .................... | 345/854 X |
| 6,268,852 B1 | * | 7/2001 | Lindhorst et al. ....... | 345/967 X |

* cited by examiner

Primary Examiner—Raymond J. Bayerl
(74) Attorney, Agent, or Firm—David A. Lundy

(57) ABSTRACT

A method and system for visually writing programs or scripts that transform structured text, including text of programs in computer languages such as Cobol, C, or C++, and electronic documents such as HTML, SGML and word processor documents. The method and system is based on interactive manipulation of a graphical representation of a tree that represents structured text. Both structured text and a tree representing structured text are displayed using a graphical user interface (GUI) of a programmed computer system, for example at. a user's graphical workstation. The user can interactively apply individual visual transformation operations to the tree representing structured text and see results of these actions immediately reflected in the structured text. In addition, the user can record a sequence of tree transformation operations as a macro program. The recorded macro program may be repeatedly and automatically executed to cause systematic change in the structured text. Also, the recorded macro program can be automatically converted to a program in a traditional programming language.

14 Claims, 3 Drawing Sheets

```
// Automatically generated C++ code
// that builds level 78 transformation Macro.
//
sm.AddAct (new SctActGoArg (DD_DATA_NAME));
sm.AddAct (new SctActCutDelete(1));
sm.AddAct (new SctActGoParent());

sm.AddAct (new SctActGoArg(DD_VALUE));
sm.AddAct (new SctActGoArg(0));
sm.AddAct (new SctActGoArg(0));
sm.AddAct (new SctActCutDelete(2));
sm.AddAct (new SctActGoParent());
sm.AddAct (new SctActGoParent());

sm.AddAct (new SctActGoParent());
sm.AddAct (new SctActCutDelete(-1));

sm.AddAct (new SctActGoMark(1));
sm.AddAct (new SctActAddArg(-1));
sm.AddAct (new SctActGoArg(-1));
sm.AddAct (new SctActPasteNew(EX_SN_SYMB_CONST));

sm.AddAct (new SctActGoArg(0));
sm.AddAct (new SctActPaste(1));
sm.AddAct (new SctActGoParent());

sm.AddAct (new SctActGoArg(1));
sm.AddAct (new SctActPaste(2));
```

FIG.3A

```
// Check if this level 78 node
// and execute macro for such nodes.
//
SctWalkOrder ProcessNode(SctExpr *const e) {
 if(e->Oper ()==DECL_DD_ENTRY &&
    e->Args (DD_LEVEL)->Value()=="78" &&
    !SctIsNull (e->Args (DD_VALUE))) {

// Set the starting node.
    s.boards[0].c_expr = e;

// Execute the macro
    sm.Execute(s);
 }
```

FIG.3B

METHOD FOR VISUALLY WRITING PROGRAMS OR SCRIPTS THAT TRANSFORM STRUCTURED TEXT PRESENTED AS A TREE

This application claims benefit of provisional application Serial No. 60/092,492 filed Jul. 8, 1998.

FIELD OF THE INVENTION

The present invention relates to building programs or scripts that transform (e.g., convert, translate) any structured text including text of programs in computer languages such as Cobol, C, or C++, and electronic documents such as SGML, HTML or word processor documents. More specifically, the invention relates to building the transformation programs or scripts interactively using a graphical user interface (GUI) of a programmed. computer system.

BACKGROUND OF THE INVENTION

A number of computer applications that transform (e.g., convert, translate) structured text use trees as internal representations of this structured text. For instance, most computer language compilers use trees to represent the compiled program structure in compiler memory.

Another example of structured text is electronically published structured documents such as SGML documents described in U.S. Pat. No. 5,708,806, or World Wide Web structured documents marked up using HTML mark-up language.

However, these prior art systems are either not concerned about transforming the tree or all tree transformations in these prior art systems are programmed using traditional programming languages such a C, C++, Java, Lisp, or Perl.

Programming tree transformations using traditional programming languages lacks visual feedback. That is, when writing a tree transformation program in a traditional programming language, a user needs to navigate complex tree structures without seeing them. Accordingly, the users often must use paper and pen to visualize tree transformations which they perform in their programs. This makes writing tree-transforming programs a labor-intensive and error-prone process that can be performed only by a small number of highly skilled programmers, and is therefore expensive.

On the other hand, graphical representations of trees in graphical user interfaces are currently widely available in most computer systems, and have become a de-facto standard for representing certain hierarchies of objects found in computer systems, such as a file system directory hierarchy or networked computer resources hierarchy.

For example, Microsoft Corporation® provides tree control that implements interactive tree browsing and manipulation capability as a default part of the operating systems Windows 95® and Windows NT®, as in U.S. Pat. No. 5,701,137. Additionally, Microsoft Corporation® provides a product named "Windows Explorer" that uses this tree control to represent files and networked computer resources as a tree.

However, in the prior art, graphical tree transformation operations, such as Cut, Copy, Delete, and Paste, are not applied to the tree nodes representing the structured text to cause a Hi change in the structured text. Further, in the prior art it is not possible to visually construct even simple programs or scripts that systematically transform such trees and corresponding structured text.

In "Microsoft Word" application Microsoft Corporation provides a tree view of Word document using "Document Map" feature. The Document Map is a coarse-grain tree that represents Word document which is a kind of structured text. However, in Microsoft Word it is not possible to cause a change in the Word document by applying graphical tree commands such as Cut, Paste, Delete to this document's Document Map. Nor is it possible to record a sequence of visual tree operations that cause a change in the document.

U.S. Pat. No. 5,715,432 discloses building GUI applications for network analysis and modeling. However, it does not relate to programming systematic transformations of the structured text and its tree.

U.S. Pat. No. 5,557,730 discloses a mechanism for graphical browsing of symbol table information of the compiled program. However, it covers only browsing of the tree and not its modification. The subject of the present invention is programming systematic changes of the tree.

U.S. Pat. No. 5,642,511 teaches a method that improves visual building of the GUI programs. The method of this patent deals with hierarchy of GUI objects and this hierarchy is represented by a tree. However, in this patent every tree transformation is performed in response to an explicit user command, and visual programming of systematic tree transformations is not even mentioned.

U.S. Pat. No. 5,696,914 likewise is concerned with the improving of GUI application building, and not with building programs that transform structured text.

U.S. Pat. No. 5,671,416 teaches a method for searching and transforming structured text, or source code. However, this patent discloses how to compose transformation programs using traditional programming languages, not in a visual manner.

U.S. Pat. No. 5,537,630 teaches visually programming GUI interfaces, and it does not relate to visual construction of tree-transforming programs.

SUMMARY OF THE INVENTION

From the foregoing, it is seen that it is a problem in the art to provide a data processing system and method which allows a user to cause the change of the structured text by manipulating visual tree representation of this text using graphical commands such as Copy, Paste, Delete and to interactively build programs or scripts that transform structured text using a graphical user interface of a computer system. According to the present invention, a data processing system and method is provided which meets the aforementioned needs in the prior art.

Specifically, the data processing system and method according to the present invention can be used to program applications that systematically convert text of computer programs.

For example, the computer programming language Cobol has more than 1 dialects. When a program is moved to a different hardware platform or a different compiler, the program may need to be systematically changed to account for differences between Cobol dialect on the old platform and the new platform. According to the present invention, Cobol program converters can be programmed interactively in a fraction of time needed to program these converters using a traditional programming language.

Additionally, the data processing system and method according to the present invention can be used in powerful program text editors. Traditional program text editors can only modify text of the computer program, but usually they cannot perform operations that require knowledge of the structure of the edited program.

Some program text editors such as Emacs are aware of the edited program structure and they would let a user to perform certain operations that cause the tree of the edited text to be transformed. However, these tree-transforming operations are programmed in a traditional programming language such as Lisp or C++, and these editors do not give user a capability to visually program text transformations by means of the underlying tree transformations. Using this invention, such a capability can be added to the program text editors.

Further, the data processing system and method according to the present invention can be used to transform HTML or SGML documents in order to extract information essential to the user of the document and to leave out non-essential elements of HTML (SGML) document such as excessive graphics or commercial messages unrelated to the essential content of the document.

Addressing the drawbacks of conventional programming of tree transforming programs or scripts where the user is required to write transformation script in a traditional computer language, this invention provides a visual and interactive method for writing such tree transforming programs or scripts. The method according to the present invention is typically implemented in an application that has a graphical user interface and runs in a windowing environment.

Specifically, in a first window (for example in a left pane of an application window), the application displays a tree that represents the structured text. In the second window (for example in a right pane of an application window), the application displays the structured text itself. The user can apply tree transforming operations to the tree nodes using familiar visual commands, such as Cut, Paste, and Delete. The effect of these operations on the corresponding structured text is immediately reflected in the text window.

Tree displayed in the first window is always synchronized with the structured text displayed in the second window: if tree node is selected by user in the first window, the corresponding fragment of structured text is highlighted in the second window; if text fragment is selected or clicked by the user in the second window, the corresponding tree node is highlighted in the first window. When tree nodes are deleted, copied or moved using the graphical tree manipulation commands, the corresponding changes are immediately reflected in the structured text window.

The set of available graphical tree operations consists of: (a) elementary system-defined operations, and (b) macro programs or user-defined operations. A sequence of individual visual operations on tree nodes can be recorded as a macro program and executed as a new single user-defined operation. Recorded macro programs can be executed on a single sub-tree specified by the user, or they can be automatically executed on all sub-trees that satisfy a user-specified search criterion.

In addition, the recorded macro program can be automatically converted to program in a traditional programming language, such as C++. This creates a capability to use visually programmed tree transformation programs in the traditional non-visual programs.

BRIEF DESCRIPTION OF THE DRAWINGS

FIG. 3A presents the C++ code that builds the Macro from FIG. 2. This code is automatically generated by Visual Code Transformer.

FIG. 3B presents the C++ code that searches for level 78 constants and executes macro built in FIG. 3A.

DETAILED DESCRIPTION OF THE INVENTION

In the preferred embodiment, the method according to the present invention is implemented in an application that has a graphical user interface (GUI) and operates in a windowing environment.

Figure 1:
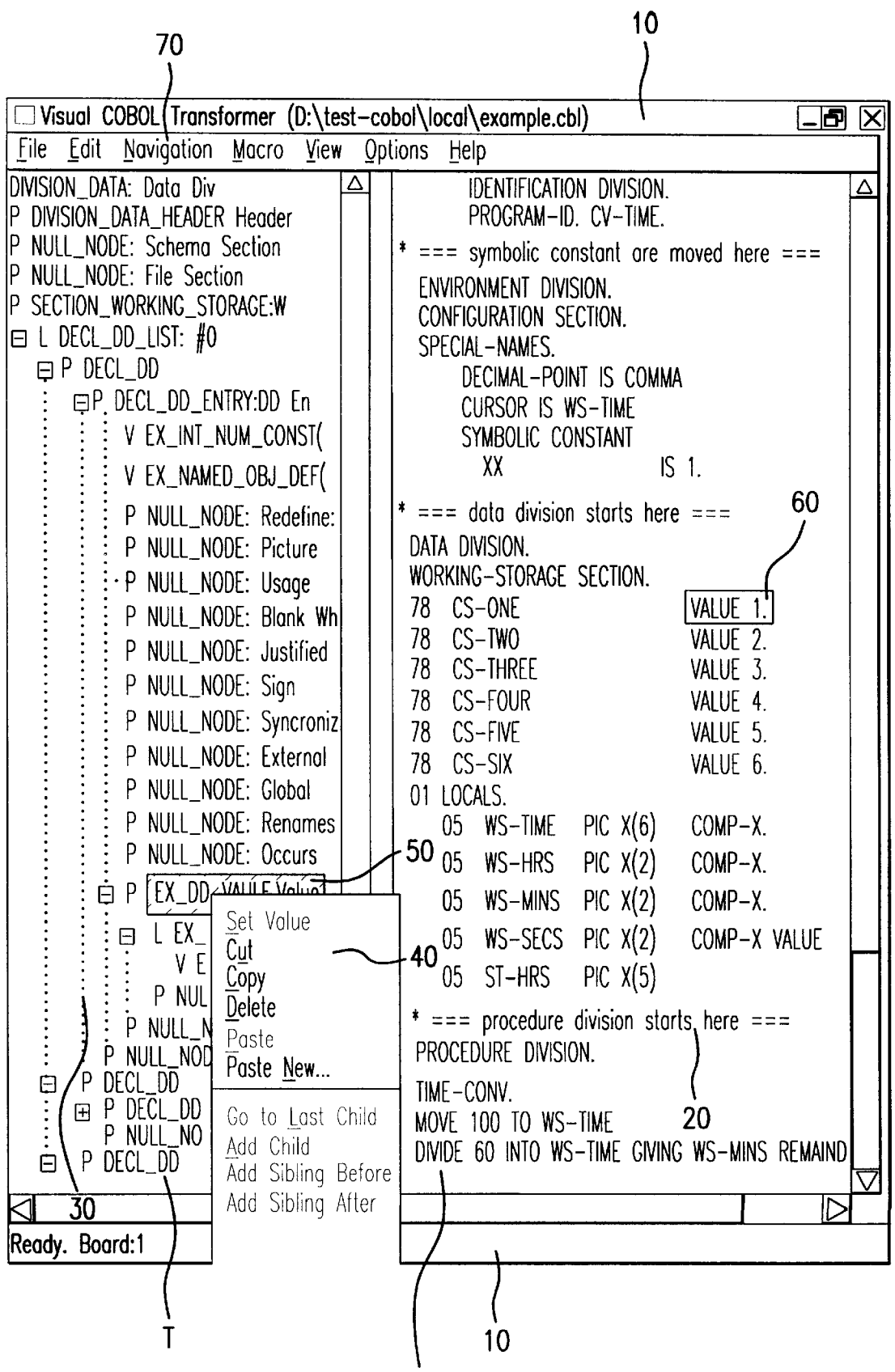
FIG. 1 represents a typical view that a user of one embodiment of this invention will see. This embodiment is the tool called Visual Cobol Transformer or Visual Code Transformer for Cobol. In this tool the structured text described above is a text of program written in computer language, such as Cobol.

FIG. 1 illustrates a front screen view 10 of an embodiment of the present invention in operation. In this embodiment, the programming tool being used is Visual Cobol Transformer or Visual Code Transformer for Cobol, and accordingly the front screen view 10 is referred to hereafter as a Code Transformer window 10. In this tool the structured text described above is text of program written in computer language, in this example Cobol. In the right pane 20 of the Code Transformer window 10, the user observes a text of a program P in a computer language. In the left pane 30 of the Code Transformer window 10, the user observes a tree T of the program P.

The left pane portion 30 and the right pane portion 20 are always synchronized, as follows. In the left pane portion 30 of FIG. 1, the tree T represents structured text, and the right pane portion 20 shows the structured text itself For example, as the user selects a tree node 50 in the left pane portion 30, then the corresponding structured text fragment 60 in the right pane portion 20 is highlighted as well. Similarly, if the user selects a text fragment 60 in the right pane portion 20, then the corresponding tree node 50 in the left pane portion 30 is highlighted. Therefore, structured text selection of the text in the left pane portion 30 and text selection in the right pane portion 20 are always synchronized.

Further, in accordance with the present invention, the user can perform operations that affect the structure of the text in the right pane portion 20 by applying familiar visual commands 40 to the visual representation of the tree nodes of the tree T in the left pane portion 30. These commands are selected from the right button menu 40 or the window menu 70. These commands include, but are not limited to, the following:

Navigation, especially mouse-based: Go to child, Go to parent, Go to next sibling, Go to previous sibling, Set bookmark, Go to bookmark.

Transfer sub-trees between main tree and clipboards: Cut, Copy, and Paste.

Insertions and Deletions: Delete, Add sibling before, Add sibling after, Add child.

Miscellaneous tree operations: Paste new mode, Set internal value in the node.

In addition to the above, a number of specific application-defined or user-defined commands can be made available. Changes in the structured text tree that are caused by these visual commands are immediately reflected in the structured text itself Further, the availability of Macro programs constitutes a significant feature of the present invention.

A Macro program records a sequence of visual tree commands. With such Macro programs in accordance with the present invention, the user can do the following:

Start recording the Macro Program.

Stop recording the Macro Program.

a Execute Macro Program on a given tree node.

Execute Macro Program on all tree nodes that satisfy user-defined search criterion.

Edit the computer-generated text of the recorded Macro Program.

Perform step-by-step debugging of the Macro Program.

Name the Macro Program. The named Macro Program becomes a new visual tree operation that can be applied to the tree nodes in the same way as system-defined elementary tree operations. The named Macro Program can be saved to disk storage for later use, and it can be loaded from disk storage.

Convert the Macro Program to traditional programming language, such as C++, so that it can be used in a traditional non-visually written program.

Figure 2:
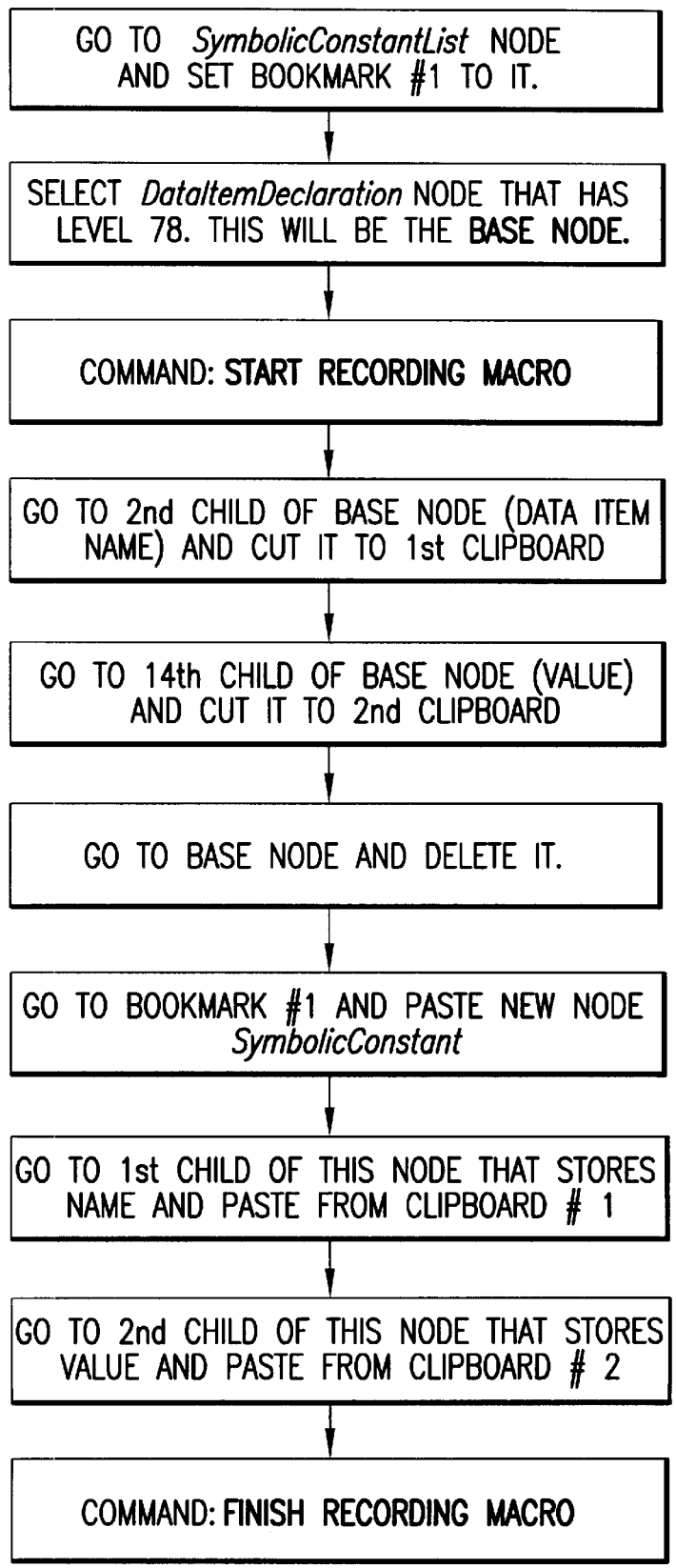
FIG. 2 represents an example of a sequence of graphical user commands that a user needs to perform to record a Macro that implements one of the transformations used in converter program named mf2fsc—Micro Focus Cobol to Fujitsu Cobol85 converter.

FIG. 2 discloses a flow chart representing an example of a sequence of graphical user commands or actions that a user needs to perform to record a Macro that implements one of the transformations used in mf2fsc—Micro Focus Cobol to Fujitsu Cobol85 converter. Micro Focus Cobol allows data items that have level 78. These data items are simply constant declarations. Fujitsu Cobol does not allow level 78 constants. With Fujitsu Cobol, all constants must be declared in SYMBOLIC CONSTANTS clause of SPECIAL—NAMES paragraph. By performing actions listed in FIG. 2, the user builds a Macro that transforms Micro Focus level 78 constants into Fujitsu symbolic constants.

FIG. 3A presents the C++ code that builds the Macro from FIG. 2. This code is automatically generated by Visual Code Transformer. This code can be used in command-line version of mf2fsc, thus demonstrating that significant portions of production-quality structured text converters can be built visually using the method of the present invention.

FIG. 3B presents the C++ code that searches for level 78 constants and executes the macro built in FIG. 3A.

Writing programs that transform structured text by transforming the tree that represents this text in a traditional way, that is using traditional programming languages such as C++ or Lisp is hard and prone to errors. This is so because tree which is a visual object has no visual representation in a traditional program and it has to be drawn on paper or imagined in one's mind which is difficult. Also often it is not obvious to the programmer how tree changes will affect the represented structured text. This invention allows programmer to see the tree that is being operated upon on a screen of computer system and to see changes in the tree to propagate immediately to the structured text that the tree represents. This is achieved by structured text being redrawn as changes are caused by user in the representing tree and by always synchronizing selection in the tree with selection in the structured text that the tree represents. Sequence of visual actions on the structured text tree may be recorded as a macro program and run at later time.

The invention being thus described, it will be evident that the same may be varied in many ways. Such variations are not to be regarded as a departure from the spirit and scope of the invention and all such modifications are intended to be included within the scope of the claims.

What is claimed is:

1. A data processing system for interactively building a computer program that transforms a tree that represents structured text using a graphical user interface of a computer system, comprising:

a) a tree producing means for analyzing structured text and representing the structured text on a computer screen in the form of a tree, the structured text comprising at least one of a computer program, a HTML document, a Cobol program, and a word processor document;

b) an interface means for providing a graphical user interface for indicating elements of the tree and for visually indicating transformations of the information produced by the tree producing means;

c) a macro program that transforms structured text represented by a tree, said program being a recorded sequence of tree transformation operations that can be replayed at a later time; and d) an operating means for performing an operation on the elements in the tree selected by the interface means.

2. The data processing system as claimed in claim 1, wherein the interface means produces output in the form of a tree in a first window and text corresponding to the tree in a second window.

3. The data processing system as claimed in claim 2, wherein the interface means causes highlighting of text in the second window to correspond to highlighting of a node in the first window.

4. The data processing system as claimed in claim 3, wherein the operating means includes visual commands applicable to tree navigation to move along the tree in a selected direction comprising one of: a forward direction, a backward direction, an up direction and a down direction.

5. The data processing system as claimed in claim 1, wherein the operating means includes visual commands applicable to transfer a tree portion between a main tree and a tree clipboard.

6. The data processing system as claimed in claim 1, wherein the operating means includes visual commands applicable to insertions and deletions of a selected tree node.

7. The data processing system as claimed in claim 1, wherein the tree is a structured text tree and the information analyzed by a tree producing means is in the form of structured text; and wherein the operating means causes changes in the tree caused by visual tree transformation commands to be immediately reflected in the structured text represented by this tree.

8. The data processing system as claimed in claim 1, wherein the macro program producing means includes steps to start and stop the macro program recording.

9. The data processing system as claimed in claim 1, wherein the macro program producing means includes steps to execute a macro program on a selected tree node.

10. The data processing system as claimed in claim 1, wherein the macro program producing means includes steps to execute a macro program on all tree nodes to satisfy user-defined search criteria.

11. A method of interactively building computer programs for transforming trees using a graphical user interface of a computer system, including the steps of:

a) analyzing structured text and representing the structured text on a computer screen in the form of a tree; and b) providing a graphical user interface for transforming the structured text by performing a graphical operation on the tree representative of the structured text; and c) recording a sequence of graphical operations on the tree to form a macro program that transforms the structured text.

12. The method of interactively building computer programs as claimed in claim 11, further comprising providing a macro program producing means, wherein the macro program producing means includes steps for starting and stopping the recording of the macro program, steps for executing a macro program on a selected tree node, and steps for executing a macro program on all tree nodes, to satisfy a user defined search criteria.

13. The method of interactively building computer programs as claimed in claim 11, further comprising providing a macro program producing means, wherein the macro program producing means produces a macro which becomes a new visual tree operation which can be applied to tree nodes.

14. A data processing system comprising structured text having a tree that represents the structured text, the tree that represents structured text displayed in a first window, the structured text simultaneously displayed in a second window, the tree in the first window synchronized with said structured text in the second window, and the text in the second window selectively highlighted to aid in relating said tree in the first window to said structured text in the second window, and visual operations performed on the tree in the first window leading to corresponding operations being immediately and automatically performed on the structured text in the second window, and the sequence of visual operations on said tree in said first window being recorded as a macro program that can be run by a user at a later time, providing a visually constructed program that transforms structured text.

* * * * *